UNITED STATES PATENT OFFICE.

ALBERT L. CLAPP, OF MARBLEHEAD, MASSACHUSETTS, ASSIGNOR, BY MESNE ASSIGNMENTS, TO FIBREBOARD COMPANY, OF BOSTON, MASSACHUSETTS, A CORPORATION OF MASSACHUSETTS.

BOOT AND SHOE AND PROCESS OF MAKING SAME.

1,380,865.     Specification of Letters Patent.     Patented June 7, 1921.

No Drawing.     Application filed July 13, 1917. Serial No. 180,478.

*To all whom it may concern:*

Be it known that I, ALBERT L. CLAPP, a citizen of the United States, and a resident of Marblehead, county of Essex, and State of Massachusetts, whose post-office address is 38 Devereux street, Marblehead, Massachusetts, have invented an Improvement in Boots and Shoes and Processes of Making Same, of which the following description is a specification.

This invention relates to the art of manufacturing boots and shoes, and has for its object an improved process for the manufacture of boots and shoes and the improved product of such process.

While in the manufacture of boots and shoes, leather is used to some extent as a stiffening material, in the form of counters and box-toes, for example, by far the greater amount of stiffening material used, particularly in the manufacture of the less expensive grades of boots and shoes, is made up of the much cheaper, so-called leather substitutes, such as leather-board or fiber-board, certain kinds of which, that are particularly adapted for use as such stiffening materials, being for this reason known as counter-board.

All such substitutes, however, have a tendency to swell and stretch when wet with water, and then to shrink in drying; and in thus shrinking they become distorted and are liable to distort or otherwise injuriously affect the shoes in which they are used when the latter are wet in use.

One of the objects of my invention is to provide a boot or shoe in which the stiffening material will not be open to this objection, and a process for making the same.

To this end I treat the counter, box-toe, or other stiffening material with a substance that will not produce shrinkage thereof, and will prevent shrinkage thereof in drying, should it subsequently become damp or wet from any cause. I may use for this purpose a solution of any suitable substance, such as an astringent like mineral acids, lime water, or a solution of a metal salt, such as salts of copper, zinc, iron, or lead or the like. A solution of alum or aluminum sulfate, for example, gives good results. Various alcohols, such as ethyl or methyl alcohol, could also be used, but these are expensive. Solutions of certain acid or double acid salts can also be used. As a solvent I preferably use water, but other suitable solvents may be used.

I will now describe one mode of carrying out my process in the manufacture of an ordinary boot or shoe, using by way of illustration an aqueous solution of alum or aluminum sulfate, containing preferably about 15% of alum or aluminum sulfate. I have found that a solution of 15% is sufficiently strong to produce the desired results, although a stronger solution may be used if desired. The counter or other stiffening material is treated with this liquid, preferably by immersion therein, until thoroughly impregnated therewith, which may take anywhere from two to five hours, but the immersion may be for a much longer period without fear of injury to the material. The counter is then removed from the solution and either dried or allowed to dry. The counter may be thus treated, either before or after it has been molded. In the former case the solution used in carrying out my process will serve as the tempering solution in which counters are usually immersed to enable them to be molded. The counter having become sufficiently dry, the manufacture of the shoe is effected in the usual manner and by the usual steps, that is to say, the upper, lining, counter, box-toe, and inner sole are assembled in their regular arrangement upon the last, the shoe is pulled over, lasted, the upper and lining stitched to the inner sole, and the outer sole applied, in the case of a welted shoe by being sewed to the welt, which will have previously been sewed around the forepart of the shoe when stitching the upper and lining to the inner sole. The heel is applied and the shoe is then subjected to the usual finishing operation to complete the same.

A shoe thus manufactured in accordance with my process may be wet without danger that the counter or other stiffening material treated in accordance with my process will shrink and break down, thus injuriously affecting the shoe and its appearance.

My process is particularly valuable in its application to the manufacture of turn shoes in which, as is well known, the upper and lining are sewed or stitched to the sole, and the stiffening material, such as the counter and box-toe, are secured in place with the sole, upper and lining turned wrong side out, the shoe being then turned right side out and completed.

In order that the shoe may thus be turned right side out with the stiffening material therein, it is necessary, before turning the shoe, to treat, or as it is termed in the art to "temper," said stiffening material to render it pliable. To this end the stiffening material has heretofore been wet with water until the required degree of pliability was secured, and the shoe then turned while said stiffening material was still in this wet or tempered condition. After the shoe has been turned the stiffening material dries out and thus regains its original stiffness.

In thus drying out, however, the stiffening material, particularly if made of any of the leather substitutes above referred to, such as leather-board or fiber-board, will shrink, thus wrinkling the upper or otherwise disfiguring or injuring the shoe or its appearance. For this reason, in the manufacture of turn-shoes, it has been impossible to use practically anything but pure leather for counters or other stiffening material, thus greatly increasing their cost of manufacture.

In accordance with my process, however, instead of using water to temper the stiffening material, I use a solution of any one of the substances above referred to, with the result that when the counter or other stiffening material so treated dries out it will not shrink, nor will it shrink should it become wet subsequently when the shoe is in use, thus avoiding the undesirable results above referred to, that occur when a counter or other stiffening material not treated in accordance with my process is used.

I am thus enabled to use in turn-shoes manufactured in accordance with my process, any of the less expensive materials used for counters or other stiffening material in the manufacture of boots and shoes, such as leather-board or fiber-board, thus materially reducing the cost of manufacture of turn-shoes.

In manufacturing a turn-shoe in accordance with my process, the counter or other stiffening material, including the box-toe if desired, is treated or tempered in a solution of any of the substances referred to, such as a 15% aqueous solution of alum or aluminium sulfate, for example, it being preferably immersed therein until it is sufficiently pliable. The sole, the upper, and lining are then assembled upon the last, wrong side out, with the treated counter and box-toe in their proper position between the upper and the lining, they being preferably secured to the former by any suitable adhesive. The shoe is then pulled over, lasted, and the upper and lining stitched to the sole. The shoe is then turned, while the counter and box-toe are still pliable from the immersion in the solution. The counter and box-toe are then allowed to dry out, preferably with the shoe upon a last, so that they shall preserve their correct shape, the heel is applied, and the shoe is finished by the usual finishing operations. The stiffening material thus treated will not shrink in drying, nor in the event of its subsequently becoming wet.

By my process, therefore, a more durable and satisfactory boot or shoe is produced, it being better suited to withstand wet weather. It is less liable to break down at the counter and toe.

While I have herein described in detail my improved process, and an improved product thereof, it is to be understood that the invention is not limited to the specific details herein given, but may be varied within wide limits, without departing from the true scope of the invention, which is definitely set forth in the claims.

Claims.

1. That step in the process of manufacturing a boot or shoe, which is characterized by treating the counter or other stiffening material with a solution for preventing shrinkage thereof.

2. That step in the process of manufacturing a boot or shoe, which is characterized by treating the counter or other stiffening material with a solution of alum or aluminum sulfate for preventing shrinkage thereof.

3. That step in the process of making boots and shoes comprising a counter or other stiffening material composed of a leather substitute, which is characterized by treating the counter or other stiffening material with a 15% solution of alum or aluminum sulfate, by immersing it in said solution until it is impregnated therewith to prevent shrinkage thereof.

4. That step in the process of making a turn-shoe, which is characterized by tempering the counter or other stiffening material before turning the shoe with a solution adapted to prevent it from shrinking in drying.

5. That step in the process of making a turn-shoe, which is characterized by tempering the counter or other stiffening material before turning the shoe with a tempering solution of alum or aluminum sulfate to prevent shrinkage thereof.

6. That step in the process of making a turn-shoe, which is characterized by tempering the counter or other stiffening material before turning the shoe with a 15% solution of alum or aluminum sulfate, by immersing it in said solution for several hours, said solution preventing shrinkage of said counter or other stiffening material during drying.

7. A boot or shoe having, in combination with its other parts, a counter or other stiffening material that has been treated with a solution to prevent shrinkage thereof.

8. A turn-boot or shoe having, in combination with its other parts, a counter or other stiffening material that has been tempered with a solution to prevent shrinkage thereof and to facilitate the turning of the shoe.

9. A boot or shoe having, in combination with its other parts, a counter or other stiffening material composed of a leather substitute that has been treated with a solution of alum or aluminum sulfate.

10. A turn-boot or shoe having, in combination with its other parts, a counter or other stiffening material composed of a leather substitute that has been tempered with a solution of alum or aluminum sulfate to facilitate the turning of the shoe.

11. That step in the process of making a boot or shoe having a counter or other stiffening material of fiberboard or leatherboard, which is characterized by treating the counter or other stiffening material with a solution for preventing shrinkage thereof.

12. That step in the process of making a boot or shoe having a counter or other stiffening material of fiberboard or leatherboard, which is characterized by treating the counter or other stiffening material with a solution of alum or aluminum sulfate.

13. A boot or shoe, having in combination with its other parts, a counter or other stiffening material of fiberboard or leatherboard that has been treated with a solution to prevent shrinkage thereof.

14. As an article of manufacture a counter for boots and shoes that has been treated with a solution to prevent shrinkage thereof.

15. As an article of manufacture a counter for boots and shoes composed of a leather substitute which has been treated with a solution of alum or aluminum sulfate.

16. As an article of manufacture stiffening material for boots and shoes that has been treated with a solution to prevent shrinkage thereof.

17. As an article of manufacture stiffening material for boots and shoes composed of a leather substitute that has been treated with a solution of alum or aluminum sulfate.

In testimony whereof I have signed my name to this specification.

ALBERT L. CLAPP.